Jan. 7, 1964
J. H. NILL
3,116,763
LOOM PICKER
Filed Jan. 12, 1962
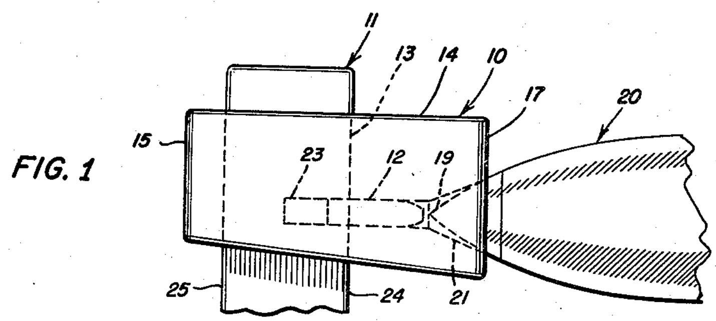
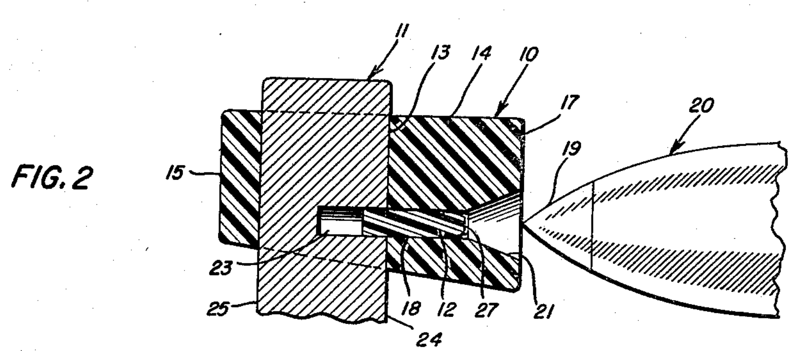
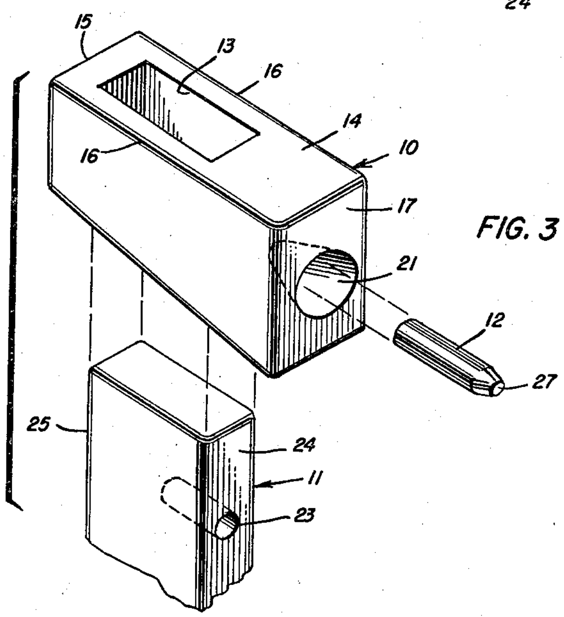
INVENTOR.
JULIUS HAMILTON NILL
BY David Rabin
ATTORNEY United States Patent Office 3,116,763 Patented Jan. 7, 1964

3,116,763
LOOM PICKER

Julius Hamilton Nill, P.O. Box 222, Concord, N.C.
Filed Jan. 12, 1962, Ser. No. 165,832
9 Claims. (Cl. 139—159)

This invention relates to loom pickers and particularly to means for securing and maintaining a picker on a picker stick for a prolonged period for minimum wear and destruction of the picker and picker stick.

Loom pickers and picker sticks are subjected to constant and severe impact shock loads causing severe wear that necessitates frequent replacement of these loom components particularly at the high speeds of shuttle reciprocation encountered in present day weaving operations. The high frequency of shuttle reciprocation and the impact shock loads to which the picker is subjected in throwing and checking a shuttle account for the high cost of replacement of parts caused by this destructive action. One of the major reasons for picker replacement has been found to be the lack of a fully satisfactory means for securing and maintaining the picker to a picker stick in order to prevent picker deflection, vibration and distortion upon shuttle impact for prolonged periods of loom operation.

Various types and means for securing a picker to a picker stick have been devised, and various materials for the picker, including leather, rubber, cord-filled rubber, laminations of rubber and plastic materials, high density polyethylene, nylon, and Teflon, among other materials, for absorbing and transmitting the impact load have been utilized. However, despite the various picker securing means and picker materials employed, the problems of attaching the picker to a picker stick persist and the picker stick has been found to be destroyed now even more rapidly than the picker. Of the many means and methods for attempting to overcome the deficiencies encountered in securing a picker to a picker stick, several are exemplified in United States Patent Nos.: 16,709; 19,428; 691,212; 730,476; 1,069,670; 1,575,598; 2,308,393; 2,671,473; and 2,754,851, among many others. In the attachment of a picker to a picker stick the primary objective appears to have been to provide a satisfactory shuttle impact-absorbing member without significant or particular attention being directed to the securing of such member or the utilization of the impact energy generated by the shuttle to assist in maintaining the picker in a set position. Prolonged cycles of shuttle reciprocation and the high shock impact of the shuttle against the picker destroy the picker clamping and securing means as well as the supporting picker stick.

This invention contemplates the provision of a picker and picker stick assembly in which shuttle impact is utilized continuously to assure picker attachment to a picker stick.

An objective of this invention is to provide a picker stick and picker combination in which the picker is provided with a defined shuttle-receiving and aligning opening for absorbing partially shuttle impact energy and to direct shuttle impact in alignment with a picker securing member for reducing picker deflection on a picker stick.

Another objective of this invention is to provide a picker that may be readily mounted on and removed from a picker stick by slidable insertion or removal of a picker key or securing member positioned in the picker in alignment with shuttle travel.

A further objective of this invention is the provision of a picker and picker stick assembly in which the picker securing member faces and is exposed at one end thereof to shuttle impact through a shuttle-receiving opening in the picker forming an air cushion upon shuttle impact for urging the picker key into a seated position.

Still other objects of this invention are to provide a simplified means for reliably securing a picker to a picker stick with a minimum number of parts and tools and for decreased costs in maintenance and replacement of parts.

Other objects and many of the attendant advantages of this combination picker and picker stick will become more readily apparent to those skilled in the loom art from the following detailed description of this invention taken in conjunction with the accompanying drawing in which like characters of reference designate corresponding parts throughout the several views, and wherein:

FIG. 1 is a side elevational view of a top portion of a picker and picker stick combination embodying this invention, and illustrating the forward portion of a shuttle upon impact with the picker;

FIG. 2 is a transverse sectional view of FIG. 1 illustrating the alignment of the picker securing member, prior to full seated position, and the forward end of a shuttle; and FIG. 3 is an exploded prespective view of the top portion of the picker, picker stick and picker securing member.

Referring now to the drawing and more particularly to FIG. 3, there is shown the components constituting this invention, in exploded view, which comprises a picker 10, picker stick 11, and a picker key or securing member 12. The picker 10 is formed of a desirable and suitable energy-absorbing material which may be of molded plastic, such as high density polyethylene commercially available as Polydur 21, Teflon, nylon, impregnated fiber, laminated rubber, such as Dayton, "Thoroughbred" type EXX, among other materials suitable for prolonged wear and capable of withstanding constant high impact shock loads.

Picker head 10 has a picker stick receiving opening 13 extending therethrough dividing the picker into head 14, heel 15, and side 16 portions. The picker face 17 is provided with a key-receiving opening 18 that extends transversely of the face at a point substantially in axial alignment with the point of impact of the head 19 of shuttle 20. Preferably the terminal portion of opening 18 has a flared or frusto-conical mouth 21 for receiving and aligning the shuttle head upon impact for reducing shuttle deflection. It is desirable that mouth 21 be of such contour as to cooperate with the shuttle head to form a small air cushion therebetween upon shuttle impact to dissipate partially the energy of impact without discharging the shuttle in an opposite direction.

A key-receiving opening 23 is drilled in picker stick 11 from the front edge 24 at a position in direct alignment with shuttle flight and the opening 18 in the picker. It has been found desirable, in order to increase picker stick life and to reduce fatigue, to drill the opening 23 approximately half the distance from the front to the rear edge 25. Although hickory has been found to be the most desirable picker stick to absorb the constant impact loads for this combination, it is contemplated that other materials such as laminated and metal picker sticks may be employed with equally satisfactory results.

In assembling the picker 10 on the picker stick 11, which stick may be tapered slightly at the terminal end thereof for a force fit, the picker is slidably mounted on the stick until the openings 18 and 23 are aligned. A cylindrical key or locking member 12, made of high density polyethylene, nylon, Teflon or other suitable deformable material, is slidably inserted into the tapered opening 21 and forced to a seated position in the openings 18 and 23 as shown in FIGS. 1 and 2. Elongated key member 12 is preferably larger in diameter than the openings 18 and 23 necessitating a driving force fit before seating into the picker stick. The forementioned materials for the key member are sufficiently deformable to permit the key to become wedged into the openings thereby securely locking the picker to the picker stick. The terminal end 27 of the key, upon seating, is exposed to the shuttle head but preferably does not contact any portion of shuttle conical nose 19.

It has been found that by positioning the picker locking member 12 in direct alignment with the path of shuttle impact and driving the member in the same direction as the shuttle before impact, the tenedncy for picker deflection, vibration and distortion have been very appreciably reduced, accounting for prolonged picker and picker stick life. Provision of a small cavity directly in line with the shuttle nose appears to form an air cushion which, upon impact, tends to urge the key 12 into its seated position rather than out of seated position.

Sufficient heat appears to be generated upon shuttle impact with the picker to expand the key member sufficiently to cause a further locking engagement of the components forming a bond therebetween. Crystallization has not occurred in any of the key members examined after prolonged use nor has any key member been sheared when in its seated position. Where softer or more resilient pickers are employed, the terminal end 27 of the key member 12 may have to be cut off shorter or peened over to avoid contact with the point of the shuttle.

It will be apparent that although a cylindrical key has been shown other configurations may be used and the surface may be serrated or otherwise modified to increase the functional resistance to maintain the key member in position. Also, various modifications may be made to the openings and the picker without departing from the spirit and purpose of this invention, and such modifications and variations are contemplated within the scope of the appended claims.

What is claimed is:

1. In combination with a loom picker stick, a picker slidably mounted on the picker stick, said picker having a shuttle-receiving face with a key-receiving opening, said key-receiving opening having a frusto-conical terminal shuttle-receiving portion, said picker stick having a key-receiving opening for cooperative alignment with said picker opening, and a cylindrical key slidably insertable into said picker and picker stick openings for securing the picker on the picker stick.

2. In combination with a picker stick, a picker slidably mounted on said picker stick, said picker having a shuttle-receiving face with a key-receiving opening extending into said picker transversely to the picker stick axis, said picker stick having a key-receiving opening for cooperative alignment with said picker opening, and a picker retaining key slidably inserted into said picker and picker stick openings and having one end thereof exposed from the shuttle-receiving face.

3. A loom picker and picker stick comprising a picker body formed of molded plastic mounted on the picker stick, said picker having a face portion with a key-receiving opening, said key-receiving opening having a frusto-conical terminal shuttle-receiving portion forming an air cushion for receiving a shuttle end therein, said picker stick having a key-receiving opening for cooperative alignment with said picker opening, and a key seated into said picker and picker stick openings with one end thereof in alignment with and exposed to shuttle impact.

4. A picker in combination with a picker stick comprising a picker body mounted on a picker stick, said picker having shuttle-engaging face portion with a key-receiving opening, said key-receiving opening having a terminal frusto-conical shuttle-receiving portion, said picker stick having a key-receiving opening cooperatively aligned with said picker opening, and a key forming locking engagement between said picker and picker stick in said openings with one end of said key being exposed to said shuttle-engaging head portion.

5. A picker and picker stick assembly comprising a picker body of polyethylene having a shuttle-engaging face, said picker face having a transverse key-receiving opening therein, a picker stick having a picker key-receiving opening on one side thereof, said picker key-receiving opening communicating with said picker stick opening, said picker key-receiving opening having a frusto-conically shaped shuttle-receiving terminal portion, and a deformable key in said picker and picker stick openings in axial alignment with shuttle flight, said key being exposed at one terminal end only to the shuttle-engaging face.

6. A picker and picker stick assembly comprising a picker with a shuttle-receiving face, said face having a key-receiving opening therein in alignment with the point of shuttle impact, said picker stick having a key-receiving opening communicating with said picker key-receiving opening, and a deformable elongated key in said picker and picker stick key-receiving openings for retaining the picker on the picker stick, said key being in alignment with shuttle travel and exposed thereto in seated position.

7. A picker and picker stick assembly comprising a picker having a picker stick receiving opening and a picker face having a picker securing opening therein, said openings extending transversely to each other, a picker stick having a picker key-receiving opening, on one side thereof, said picker and picker stick openings communicating with each other and in alignment with the path of shuttle impact, said picker key-receiving opening having a conically-shaped shuttle-receiving terminal portion for receiving shuttle impact, and an elongated deformable key in seated engagement with said picker and picker stick and exposed to the shuttle-receiving picker face.

8. A picker for loom shuttles comprising, in combination, with a picker stick, a picker mounted on a picker stick, said picker having a shuttle-receiving head portion with a face thereon, said face having a key-receiving opening therein in axial alignment with shuttle impact, said picker stick having a key-receiving opening cooperatively aligned with said key-receiving opening in said picker face, said key-receiving opening in said picker and picker stick being in line with shuttle travel, and a key slidably insertable in said picker and picker stick openings for retaining the picker on said picker stick, said key being exposed to shuttle impact and in alignment therewith.

9. A picker for loom shuttles comprising, in combination, with a picker stick, a picker mounted on a picker stick, said picker having a shuttle-receiving head portion with a face having a key-receiving opening, said picker stick having a key-receiving opening cooperatively aligned with said key-receiving opening in said picker face, said key-receiving openings in axial alignment with shuttle travel, and a key in said openings locking said picker and picker stick together.

References Cited in the file of this patent

UNITED STATES PATENTS

| | | |
|---|---|---|
| 2,084,102 | Merrick | June 15, 1937 |
| 2,549,394 | Shivell et al. | Apr. 17, 1951 |
| 2,569,994 | Huffman | Oct. 2, 1951 |
| 3,020,932 | Rivera | Feb. 13, 1962 |

FOREIGN PATENTS

| | | |
|---|---|---|
| 802,932 | Great Britain | Oct. 15, 1958 |